(12) United States Patent
Liu et al.

(10) Patent No.: US 8,615,594 B2
(45) Date of Patent: Dec. 24, 2013

(54) VIRTUAL MEDIA WITH FOLDER-MOUNT FUNCTION

(75) Inventors: YiLi Liu, Richmond (CA); Xin Yao, Richmond (CA)

(73) Assignee: Aten International Co., Ltd., Shijr (TW)

( * ) Notice: Subject to any disclaimer, the term of this patent is extended or adjusted under 35 U.S.C. 154(b) by 1146 days.

(21) Appl. No.: 12/503,814

(22) Filed: Jul. 15, 2009

(65) Prior Publication Data

US 2011/0016466 A1  Jan. 20, 2011

(51) Int. Cl.
*G06F 15/16* (2006.01)

(52) U.S. Cl.
USPC ............ 709/229; 709/718; 709/707; 709/711

(58) Field of Classification Search
USPC .......................................... 709/229
See application file for complete search history.

(56) References Cited

U.S. PATENT DOCUMENTS

| | | | |
|---|---|---|---|
| 5,950,199 A | 9/1999 | Schmuck et al. | |
| 7,260,624 B2 | 8/2007 | Sivertsen | |
| 2003/0131246 A1* | 7/2003 | Reeves et al. | 713/182 |
| 2004/0039827 A1* | 2/2004 | Thomas et al. | 709/228 |
| 2004/0193621 A1* | 9/2004 | Moore et al. | 707/100 |
| 2004/0193672 A1* | 9/2004 | Samji et al. | 709/200 |
| 2005/0235281 A1 | 10/2005 | Lefrancois | |
| 2005/0276092 A1 | 12/2005 | Hansen et al. | |
| 2007/0143532 A1 | 6/2007 | Gorobets et al. | |
| 2007/0143566 A1 | 6/2007 | Gorobets | |
| 2007/0143567 A1 | 6/2007 | Gorobets | |
| 2007/0143570 A1 | 6/2007 | Gorobets et al. | |
| 2007/0156710 A1 | 7/2007 | Kern et al. | |
| 2007/0174526 A1* | 7/2007 | Blackwell et al. | 710/73 |
| 2009/0150532 A1 | 6/2009 | Chan et al. | |
| 2009/0171891 A1 | 7/2009 | Nochimowski et al. | |

(Continued)

FOREIGN PATENT DOCUMENTS

| | | |
|---|---|---|
| CN | 101232422 A | 7/2008 |
| TW | 440769 | 6/2001 |

(Continued)

OTHER PUBLICATIONS

Taiwanese Office Action, dated Feb. 5, 2013 in a counterpart Taiwanese patent application, No. TW 098144860.

(Continued)

*Primary Examiner* — Charles C Jiang
*Assistant Examiner* — Deepa Belur
(74) *Attorney, Agent, or Firm* — Chen Yoshimura LLP

(57) ABSTRACT

A virtual media (VM) method for mounting a folder stored in a storage device of a client for accessed by a server as a virtual drive. The client assigns virtual cluster indices to each file in the folder, and creates a file-cluster index table to store the assigned virtual cluster indices. The client also creates a VM file system complying with the FAT file system standard except that only subdirectories and no data files are stored in the VM FAT file system. The VM FAT table uses virtual cluster indices rather than actual cluster indices. Data written by the server are stored in a temporary data area without modifying the actual file system of the storage device. The virtual sectors requested to be written are "dirty", and the dirty sector numbers and corresponding temporary sector numbers are stored in a dirty sector index table for use in a write-back step.

16 Claims, 9 Drawing Sheets

(56) References Cited

U.S. PATENT DOCUMENTS

| | | | |
|---|---|---|---|
| 2009/0171911 A1 | 7/2009 | Nochimowski et al. | |
| 2009/0171983 A1* | 7/2009 | Samji et al. | 707/10 |
| 2009/0172050 A1 | 7/2009 | Nochimowski et al. | |
| 2009/0172274 A1 | 7/2009 | Nochimowski et al. | |
| 2010/0235831 A1* | 9/2010 | Dittmer | 718/1 |
| 2010/0306445 A1* | 12/2010 | Dake | 711/6 |

FOREIGN PATENT DOCUMENTS

| | | |
|---|---|---|
| TW | 200707218 | 2/2007 |
| TW | 200732918 | 9/2007 |
| TW | 200745862 | 12/2007 |
| TW | 2008-10478 | 2/2008 |
| TW | 200926675 | 6/2009 |

OTHER PUBLICATIONS

Microsoft Corporation, "Microsoft Extensible Firmware Initiative FAT32 File System Specification, FAT: General Overview of On-Disk Format", Version 1.03, Dec. 6, 2000.

"File Allocation Table", Wilipedia, http://en.wikipedia.org/wiki/File_allocation_table, 18 pages, printed from the Internet on Jul. 15, 2009.

Chinese Office Action, dated Jun. 5, 2012 in a counterpart Chinese patent application, No. CN 201010135013.1.

\* cited by examiner

Cluster index

| 0 | 1 | 2 | 3 | 4 | 5 | 6 | 7 | 8 | 9 | …… | N |
|---|---|---|---|---|---|---|---|---|---|---|---|
| Reserved | 4 | 5 | 6 | EOC | 7 | EOC | | | | …… | |

FAT entry

Fig. 2a

Clusters

| 0 | 1 | 2 | 3 | 4 | 5 | 6 | 7 | 8 | 9 | …… | N |
|---|---|---|---|---|---|---|---|---|---|---|---|
| | | File#1 (1) | File#2 (1) | File#1 (2) | File#2 (2) | File#1 (3) | File#1 (4) | Empty | Empty | …… | Empty |

Fig. 2b

| Reserved region |
|---|
| FAT region |
| Root directory region |
| File and directory data region (Files, including data files and subdirectories) |

Fig. 2c

| VM Reserved region |
|---|
| VM FAT region |
| VM Root directory region |
| VM File and directory data region (subdirectories only) |

Fig. 3a

Virtual cluster index

| 0 | 1 | 2 | 3 | 4 | 5 | 6 | 7 | 8 | 9 | ...... | M |
|---|---|---|---|---|---|---|---|---|---|--------|---|
| Reserved | | 3 | 4 | 5 | EOC | 7 | EOC | | | ...... | |

Virtual FAT entry

Fig. 3b

| Filename and path | Properties | Start virtual cluster index | End virtual cluster index |
|---|---|---|---|
| D:\...\Folder1\ | ...... | 3 | 4 |
| D:\...\Folder1\File1.doc | ...... | 6 | 10 |
| D:\...\Folder1\folder2\File2.exe | ...... | 16 | 20 |
| ...... | ...... | ...... | ...... |

Fig. 3c

| Virtual sector number | Position in temp data area |
|---|---|
| 0 | 0 |
| 6 | 1 |
| 7 | 2 |
| 4 | 3 |
| 10 | 4 |
| ...... | ...... |

Fig. 3d

VIRTUAL MEDIA WITH FOLDER-MOUNT FUNCTION

BACKGROUND OF THE INVENTION

1. Field of the Invention

This invention relates to a virtual media system, such as virtual media in an IKVM (KVM-Over-IP) system. In particular, it relates to a virtual media system with folder-mount function.

2. Description of the Related Art

A KVM (keyboard video mouse) switch is a device that allows one or more user consoles to selectively communicate with one or more computers connected to the KVM switch as if the user console is directly plugged into the computer. In a conventional KVM switch configuration, one or more consoles (each including a keyboard and/or mouse and a display device) are connected to the KVM switch by cables, and a plurality of computers are connected to the KVM switch by cables. A network-enabled KVM switch (also referred to as a network-based or IP-based KVM, IKVM, or KVM over IP) uses a network protocol (e.g. TCP/IP) as its communication protocol, and can be accessed from any computer on a network (such as the Internet, an Intranet, a WAN, a LAN, Ethernet, a wireless network, etc.) A remote operator can log in to an IKVM switch from anywhere on the network via a browser, and can exchange keyboard, video and mouse signals with any one of the computers connected to the IKVM switch. An IKVM switch has a controller, referred to as an IKVM controller, which is connected to a controller/circuit/chip (NIC) for handling packets containing keyboard and mouse signals received from a remote console on a network, and transmits packets containing video signals and other signals to the network via the NIC.

Virtual media is a technology for sharing files in a system comprising two computers connected via a network such as the Internet, so that a storage device physically connected to the first computer can be accessed by the second computer as if the storage device is located on the second computer. Virtual media technology has been used in KVM switch systems where a client computer accesses an IKVM switch via a network to control a server computer connected to the IKVM switch. Using the virtual media technology, a storage device physically connected to the client computer can be presented to the server computer as virtual media.

For example, U.S. Pat. No. 7,260,624 describes a system where a local computer 102 and a remote computer 120 are connected via a network 118, with an interaction device 110 connected between the local computer and the network. The patent describes: "In addition to receiving user input, the interaction device 110 may also provide for additional interaction with the remote computer 120 by providing a USB connection to a USB port 109 of the local computer 102. The USB connection allows the interaction device 110 to emulate USB devices for the local computer 102, such as additional storage devices including devices that the local computer 102 may use when booting-up. For example, the remote computer 120 may provide a floppy, CD-ROM, or hard disk drive that contains a boot-up sequence to be used by the local computer 102. Upon a connection being established over the network 118 between the interaction device 110 and remote computer 120, the local computer 102 may boot from a media source of the remote computer 120 with the boot-up sequence provided through the USB port 109." (Col. 5, lines 27-41.)

In another example, U.S. Pat. Appl. Pub. No. 2007/0174526, entitled "Virtual media system, method and devices", describes a KVM system which provides for USB devices to be accessed by target computers: "A KVM switch connects a client with a target server via a network, the client computer having at least one device attached thereto. A second mechanism connects to a USB port of the target and communicates with the target using a USB protocol. A client mechanism communicates with the second mechanism via the network. A virtual media mechanism enables the target server to access the USB device attached to the client." (Abstract.) This method allows a physical storage device attached to the client computer, such as a floppy drive, CD drive, removeable disk, etc. to be mapped as a virtual drive on the target computer. (See, e.g., FIG. 6(c) and paragraphs [0267]-[0270] of this publication.)

For consistency, in this disclosure, the computer to which the storage device is physically attached is referred to as the client computer or client, and the computer to which the storage device is mapped as a virtual medium is referred to as the server computer or server.

Conventional virtual media methods only allow an entire physical storage device (or possibly a logical drive if the storage device is partitioned) to be mapped as a virtual drive on the server. This method, referred to herein as disk-mount, has many disadvantages, such as poor reliability and poor security. For example, the content of the entire storage device (or drive) would be accessible to the server, so the client is unable to protect the confidentiality and security of contents on the storage device. Further, when write-back function is implemented in a disk-mounted system, when an error occurs during a write operation, such as an error due to network transmission, there is a risk of crashing the storage device.

SUMMARY OF THE INVENTION

Accordingly, the present invention is directed to a virtual media method and apparatus in an IKVM system that substantially obviates one or more of the problems due to limitations and disadvantages of the related art.

An object of the present invention is to provide a virtual media method and apparatus that supports folder-mount functions.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a method implemented in a system having virtual media functions, including: by a server control module, emulating a storage device complying with a standard protocol for a server computer, including receiving a first command from the server computer and transmitting a second command to a virtual media (VM) access control module based on the first command, further including transmitting a first reply to the server computer based on a second reply received from the VM access control module; by the virtual media (VM) access control module, transmitting via a network a third command to a virtual media (VM) management software module of a client computer based on the second command received from the server control module, and transmitting to the server control module the second reply based on a third reply received from VM management software module via the network; and by the VM management software module, transmitting via the network a third reply to the VM access control module in response to the third command received from the VM access control module, wherein the first reply enables the server to access, as if a local drive, a specified one of a plurality of folders stored in a storage device connected to the client computer without allowing the server to access to other contents of the storage device. The network may be the Internet. The first command received by the server control module from the server computer may be a read command or a write command.

In another aspect, the present invention provides, in a system including a client computer and a server connected to each other, the client computer having a storage device storing a plurality of files and folders using a file system, a method for presenting one of the folders to the server to be accessed as a virtual drive, comprising: (a) selecting the one folder to be accessed by the server, the selected folder containing a plurality of subdirectories and data files; (b) for each data file in the selected folder, assigning a sequence of one or more virtual cluster indices to the data file based on a size of the data file; (c) generating a virtual media (VM) file system on the client computer for the selected folder, the VM file system including VM index information describing the sequence of virtual cluster indices assigned to each data file of the selected folder, without including any data content of the data files; (d) generating an initial-state data structure which stores an initial state of each data file in the source folder, the initial state of each data file including its name and path in the file system of the storage device, its properties, and the virtual cluster indices assigned to it in step (b); and (e) in response to a VM read sector command specifying a virtual sector number for reading a data, where the virtual sector numbers is related to a virtual cluster index by a predetermined conversion formula, performing a VM read function which includes: (e1) if the specified virtual sector number is a sector in the VM file system, reading the data from the sector in the VM file system; and (e2) if the specified virtual sector number is not a sector in the VM file system, determining the data file to which the sector belongs using the initial-state data structure and using the predetermined conversion formula, obtaining a filename and path of the data file and a sector offset of the virtual sector within the data file, and reading the data from the storage device using the filename and path and the sector offset.

In yet another aspect, the present invention provides a computer program product comprising a computer usable medium having a computer readable program code embedded therein for controlling a client computer, the computer readable program code configured to cause the client computer to execute the above process for presenting one of the folders to a server to be accessed as a virtual drive.

In yet another aspect, the present invention provides a system implementing virtual media functions, including: a virtual media (VM) management software module in a client computer; a VM access control module connected to the client computer by a network; and a server control module connected to the VM access control module, the server control module emulating a storage device complying with a standard protocol for a server computer, wherein the VM management software module enables the server to access, as if a local drive, a specified one of a plurality of folders stored in a storage device coupled to the client computer without allowing the server to access to other contents of the storage device.

In yet another aspect, the present invention provides, in a system including a first computer having a first OS and a second computer having a having a second OS connected to each other via a remote management device and a network, the first computer being able to access a storage device having a plurality of folders using a first file system via the first OS, a method for presenting one of the folders to the second computer to be accessed as a USB drive simulated by the remote management device, comprising: (a) selecting the one folder from the storage device to be accessed by the second computer; (b) managing the selected folder using a second file system, corresponding to the first file system, by the second computer, wherein the selected folder is deemed a USB device by the second OS; (c) in response to a read command to the selected folder, the first OS reading a data from the selected folder, transmitting the data to the second computer via the remote management device and the network. The method may further comprise: (d) in response to a write-back command to the selected folder issued by the second computer, the first OS writing a data from the second computer to the selected folder after the storage device is disconnected from the second computer. The data may be used to boot the second computer, or update a software on the second computer.

It is to be understood that both the foregoing general description and the following detailed description are exemplary and explanatory and are intended to provide further explanation of the invention as claimed.

BRIEF DESCRIPTION OF THE DRAWINGS

FIG. 2a schematically illustrates an exemplary FAT table in a conventional file system FIG. 2b schematically illustrates the clusters and their content in an exemplary conventional file system.

FIG. 2c schematically illustrates the file system including various regions in a conventional file system.

FIG. 3a schematically illustrates the virtual media file system including various regions according to an embodiment of the present invention.

FIG. 3b schematically illustrates an exemplary virtual media FAT table according to an embodiment of the present invention.

FIG. 3c schematically illustrates an exemplary file-cluster index table according to an embodiment of the present invention.

FIG. 3d schematically illustrates an exemplary dirty sector index table according to an embodiment of the present invention.

DETAILED DESCRIPTION OF THE PREFERRED EMBODIMENTS

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment (as well as some alternative embodiments) of the present invention.

Figure 1:
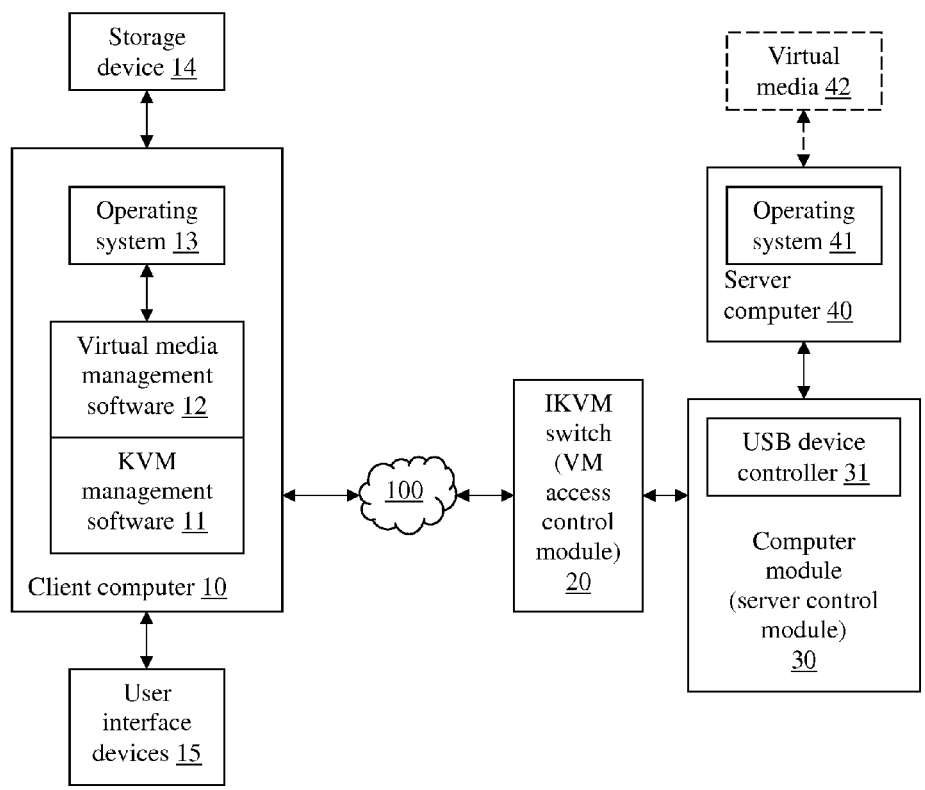
FIG. 1 illustrates an IKVM system with virtual media capabilities according to an embodiment of the present invention.

FIG. 1 illustrates an IKVM system with virtual media capabilities. A client computer 10 is connected to an IKVM switch 20 via a network 100. The network 100 is typically the Internet, but it may also be a LAN, WAN, or any other suitable type of network. The client computer 10 and the IKVM switch 20 communicate over the network 100 using a suitable communication protocol such as TCP/IP. A plurality of server computers 40 (only one is shown) are connected to the IKVM switch 20 via respective computer modules 30 (only one is shown). In one embodiment, each computer module 30 is connected to the IKVM switch 20 by a Cat5 cable; each computer module 30 has short cables with connectors for directly plugging into the relevant ports of the server computer 40, such as a monitor port for video signals, keyboard and/or mouse port(s) for keyboard and/or mouse signals, and a USB port for data transmission. The computer module 30 communicates with the IKVM switch 20 using an internal communication protocol. Data transfer between the computer module 30 and the server computer 40 is done using a suitable standard protocol such as the USB protocol.

Alternatively (not shown in FIG. 1), the computer modules 30 are not provided, and their functions are integrated into the IKVM switch 20. In this alternative configuration, the server computers 40 are connected directly to the IKVM switch 20 by short cables.

The client computer 10 is connected to a set of user interface devices 15 which include, for example, a monitor, a keyboard, and a mouse. The keyboard and mouse signals and the video signals are transmitted between the user interface devices 15 and the server computer 40 via the IKVM switch 20 and computer module 30 in a manner well known in the IKVM art and will not be described in more detail here. The IKVM software 11 of the client computer, along with suitable hardware/firmware of the IKVM switch 20 and the computer module 30, perform the function of processing and transmitting the keyboard, mouse and video signals.

The client computer 10 has attached to it a storage device 14, such as a hard disk drive (HDD), a CD/DVD ROM, a flash drive, a floppy disk drive, etc. The storage device 14 may be physically a part of the client computer 10 (such as an internal hard disk), or may be plugged into the client computer (such as a USB flash drive) or connected to the client computer by a short cable (such as an external hard disk). The client computer 10 may be connected to the storage device 14 by any suitable communication interfaces such as SCSI, IDE, USB, etc. The storage device 14 may be partitioned into multiple logical drives each having its drive letter. As described in more detail later, the storage device may also be a network-shared folder.

According to embodiments of the present invention, the client computer 10 can present the contents of a folder on the storage device 14 to the server computer 40 as a virtual storage device, shown as virtual media 42 in FIG. 1. In other words, although only the content of one folder on the storage device 14 is presented to the server computer 10 for access (read and/or write), to the server computer 40, it appears that a storage device (virtual media 42) containing these contents is attached to the server computer 40. The other contents of the storage device 14 (other than the folder) are inaccessible to the server computer through the virtual media. For convenience, this is referred to as folder-mount, as opposed to the conventional disk-mount technology. The folder to be presented to the server computer 40 may include subfolders, and may itself be a subfolder of another folder on the storage device 14.

The folder-mount function of the present invention is primarily implemented by a virtual media management software module 12 executed by the client computer 10. The virtual media management software module 12 may be a software module of the KVM management software 11 of the client computer 10, or it may be a separate software program. The folder-mount method is described now with reference to FIGS. 2a-9.

According to a conventional FAT (File Allocation Table) file system, each drive of the storage medium is divided into multiple sectors, where each sector is typically 512 bytes in size. A predetermined number of sectors (e.g., 2, 4, 8, 16, etc.) form a cluster. Each file is stored in one or more clusters depending on the file size, where the clusters are not necessarily continuous. A File Allocation Table (FAT, also called FAT table) is provided to record which clusters (and their order) each file is stored in. A FAT table can be viewed as a two-column table, where the first column contains the cluster index (from the first to the last cluster of the drive), and the second column (the FAT entries) indicate, for each cluster index, which cluster stores the next fragment of the file. For example, in the exemplary FAT table shown in FIG. 2a, the FAT entry for cluster #2 is 4, indicating that cluster #4 stores the next fragment of the file after cluster #2. Thus, this exemplary FAT table indicates that a file is stored in clusters #2, #4, #6 and #7 in that order ("EOC" indicates that cluster #7 is the last cluster for this file); and another file is stored in clusters #3 and #5 in that order. FIG. 2b schematically shows the clusters and their content in an example corresponding to FIG. 2a.

Note that the "file" in the above description more generally refers to a directory entry, which may be a data file or a subdirectory. The term "file" may be used in the disclosure to refer to either a data file or a directory entry when its meaning is clear from the context.

The starting cluster of each directory entry is stored in the root directory (for files and subdirectories in the root folder) or a subdirectory (for files and subdirectories in subfolders). In addition, the root directory or the subdirectory stores the properties of each file, such as file name, size, time of creation, time of last modification, attributes, etc. In the FAT file system, a directory (or file container) is a regular file that has a special attribute indicating it is a directory. Note that some file systems do not have a root directory region, and the root directory is stored in the file and directory data region.

FIG. 2c illustrates the content of a drive, which includes a reserved region, a FAT region storing a FAT table, a root directory region, and a file and directory data region. The file and directory data region includes the clusters that stored the data of the files (including directories, which are stored as files). The management of the file system is carried out by the operating system (OS) of the computer. The reader is assumed to be familiar with the conventional FAT file system.

To accomplish folder-mount, the client computer 10 (the virtual media management software 12) creates a virtual media (VM) file system for the virtual media, which is a structure that simulates a file system. The virtual media file system includes virtual media reserved region, virtual media FAT region, a virtual media root directory region, and a virtual media file and directory data region, as schematically illustrated in FIG. 3a. The data in all of these regions comply with the FAT file system standard. The VM reserved region stores the same types of information of the reserved region of a normal drive. The VM root directory region stores a root directory which contains the starting virtual cluster indices for the files or subdirectories of the folder to be mounted (referred to hereinafter as the source folder). The VM file and directory data region includes clusters that store all subdirectories of the source folder; it does not include any clusters that store the actual data content of the regular files that are not subdirectories. As a result, the VM file system does not occupy a large space on the storage device, and is fast to create. Note that like conventional file systems, the VM root directory region is not necessary and the root directory may be stored in the VM file and directory data region.

The VM FAT region stores a VM FAT table which has a format complying with the normal FAT table format, but only contains files and subdirectories within the source folder. More specifically, the VM FAT table is a two-column table, where the first column contains the virtual cluster index (from the first to the last virtual cluster of the virtual drive), and the second column (the FAT entries) indicate, for each virtual cluster index, which virtual cluster stores the next fragment of the file. The clusters of the virtual drive are referred to as virtual clusters here because they do not actually exist on the storage device. FIG. 3b illustrates an exemplary VM FAT table.

Note that the last virtual cluster index is M, which is determined by the size of the virtual drive. In other words, the virtual cluster indices assigned to the files in the source folder all fall within the size of the virtual drive. The size of the virtual drive is smaller, typically much smaller, than the value N in FIG. 2a. The size of the virtual drive can be any value defined by the operator during the mounting process. The defined size of virtual drive is equal to or smaller than the size of the actual drive; typically, it is much smaller than the actual drive. For example, the actual drive may be 60 GB in size, and the virtual drive may be 1 GB in size. Further, the size of the virtual drive should be defined such that the amount of free space on the virtual drive is smaller than the amount of actual free space on the actual drive.

The VM FAT table is generated by client computer 10 when mounting the folder. The client computer 10 cannot simply copy the FAT table of the actual drive because in the VM FAT table, all files must be "stored" in virtual clusters 1 to M, whereas on the actual drive, a file within the source folder could be stored in a cluster having an index greater than M. When generating the VM FAT table, the client computer 10 gathers all the files in the source folder, assigns virtual clusters to the files (the number of virtual clusters assigned to each file depends on its size, e.g. how many actual clusters are used to store it), and record the virtual cluster indices in the VM FAT table. Preferably, the virtual clusters are assigned such that the files occupy continuous virtual clusters, as in the example shown in FIG. 3b; but the files may also be assigned non-continuous virtual clusters. The starting virtual cluster index of each file is store in the root directory or the subdirectory in a similar manner as in a normal (conventional) file system.

To the server computer 40, the VM reserved region, VM FAT region and VM root directory appear to be the corresponding components of an actual drive, and the server computer 40 uses these data to manage and access the virtual drive. All sectors of the virtual drive can be modified by the server computer when accessing the virtual drive as described in more detail later.

In addition to the VM file system, the client computer also generates a file-cluster index table during the folder mounting process. The file-cluster index table stores, for each file and subfolder in the source folder, its filename and path in the actual file system of the actual drive, its file properties, and the virtual clusters assigned to it. That is, the file-cluster index table indicates a corresponding relationship between the physical file system and the virtual file system. FIG. 3c illustrates an exemplary file-cluster index table. If the files are assigned continuous virtual cluster during mounting, then the virtual clusters assigned to the file can be represented by a start virtual cluster index and an end virtual cluster index, as in the example shown in FIG. 3c. If the files are assigned discontinuous virtual clusters, then the virtual clusters will be represented by an ordered list of the virtual clusters. The file-cluster index table is created at the time of mounting, and is not modified when the server accesses the virtual drive. Therefore, it preserves the state of the VM file system at the time of mounting, and will be used during virtual media access and during the un-mounting process as will be described in more detail later.

During virtual media access, the client computer 10 uses a temporary data area to store data that is written to the virtual drive by the server computer. The file data stored in clusters/sectors of the actual file system are not modified during the VM access process; rather, the sectors of the actual file system that are requested to be modified by the server during VM access are deemed "dirty sectors", and the data intended for these sectors are stored in temporary sectors in the temporary data area. The client computer 10 maintains a dirty sector index table which stores a list of the dirty sectors and the corresponding temporary sectors in the temporary data area. As schematically illustrated in FIG. 3d, the dirty sector index table may be considered a two-column table, where the first column stores the sector numbers of the dirty sectors in the virtual drive (i.e. their virtual sector numbers), and the second column stores the sector positions of the corresponding temporary sectors in the temporary data area. The dirty sector index table is gradually built up during virtual media access when the server 40 writes to the virtual drive. For example (see FIG. 3d), when the server writes to sector 6 of the virtual drive, the client 10 writes the data in sector 1 (position 1) of the temporary data area without modifying the actual sector of the actual file system, records the dirty sector number in virtual drive (6) in the first column of the dirty sector index table, and records the corresponding position of temporary data area (1) in the second column of the dirty sector index table.

The dirty sector index table is necessary when the virtual media is mounted to allow a write function. If write is not allowed, the dirty sector index table is not necessary and the client will not store any data in temporary sectors.

The temporary data area is preferably a physical area of the actual drive. Alternatively, if the amount of data in the temporary data area is sufficiently small, the temporary data area may be in the RAM of the client computer 10.

Note that in a FAT system, read and write commands are typically for reading and writing a sector, rather than a cluster. In a storage drive (an actual drive), cluster indices and sector numbers are related to each other by a standard formula which depends on the number of sectors per cluster. In preferred embodiments of the present invention, the modified data are managed on a sector basis, rather than a cluster basis. Thus, sectors, not clusters, are deemed dirty or not dirty. Of course, it is also possible to manage modified data on a cluster basis, but this is less efficient in terms of the use of space.

Figure 4:
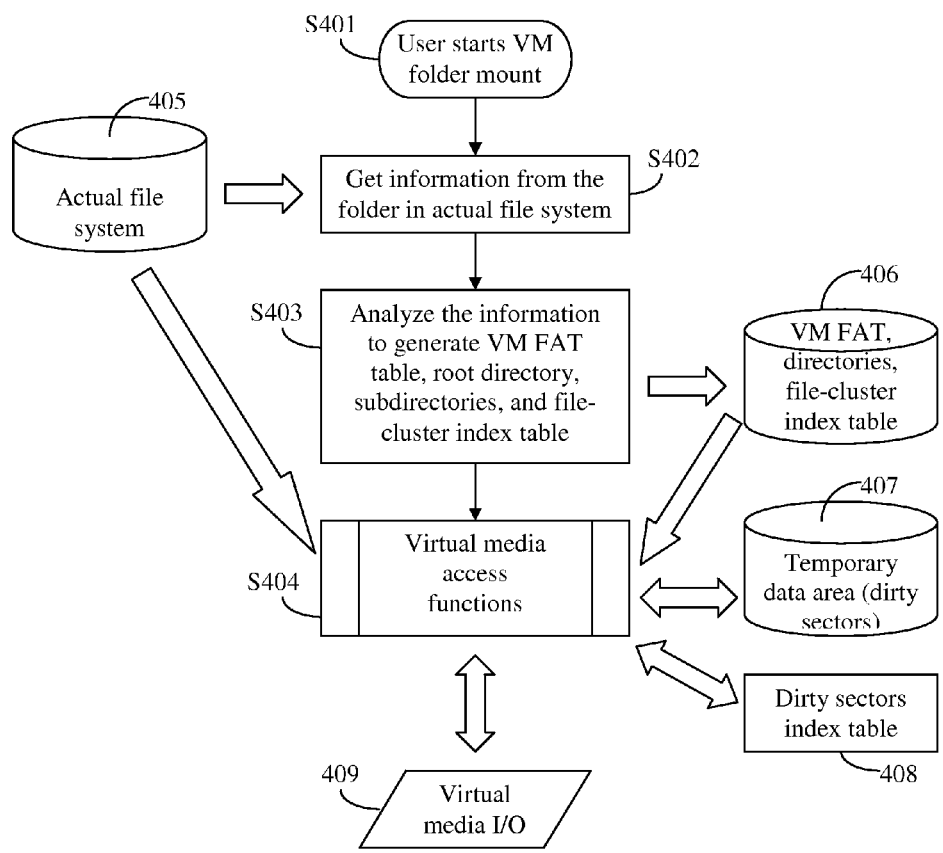
FIG. 4 schematically illustrates a mounting process for virtual media folder mount according to an embodiment of the present invention.

FIGS. 4-8 schematically illustrate the folder mounting and virtual media access process. The steps in FIGS. 4-8 are performed by the Virtual media management software 12 of the client computer 10. FIG. 4 shows the mounting process. In step S401, the user at the client computer 10 initiates a virtual media folder mounting process. This may be accomplished by a suitable user interface tool which allows the user to select which folder of the storage device 14 (the source folder) is to be mounted on the server computer 40 as virtual media and to issue a mount command. The client computer 10 gathers information about the source folder and its content from the actual file system 405 (step S402), and analyzes the gathered information to generate the VM FAT table, VM root directory, VM subdirectories, and the file-cluster index table (step S403). The information gathered in step S402 includes all information needed to generate the VM FAT etc., for example, filename and path of the files in the actual file system (to generate the file-cluster index table), sizes of the file in number of clusters (to assign virtual clusters to the files and generate the VM FAT table), subdirectories (to generate the directory data in the VM file system), etc. The VM FAT table, VM root directory, VM subdirectories, and the file-cluster index table are stored in an area 406 of the storage device 14.

Then, the client computer executes the virtual media access functions (step S404), during which the client computer reads data from the actual file system 405, obtains information from the VM FAT table, directories, file-cluster index table, etc. 406 that were generated in step S403, reads and writes data in temporary sectors in the temporary data area 407, and reads and writes data in the dirty sectors index table 408. During the VM access functions, the client computer receives virtual media I/O commands 409 from the server computer 40 (via the computer module 30 and the IKVM switch 20), and responds to the I/O commands. This VM access functions are show in more detail in FIGS. 5-8.

Figure 5:
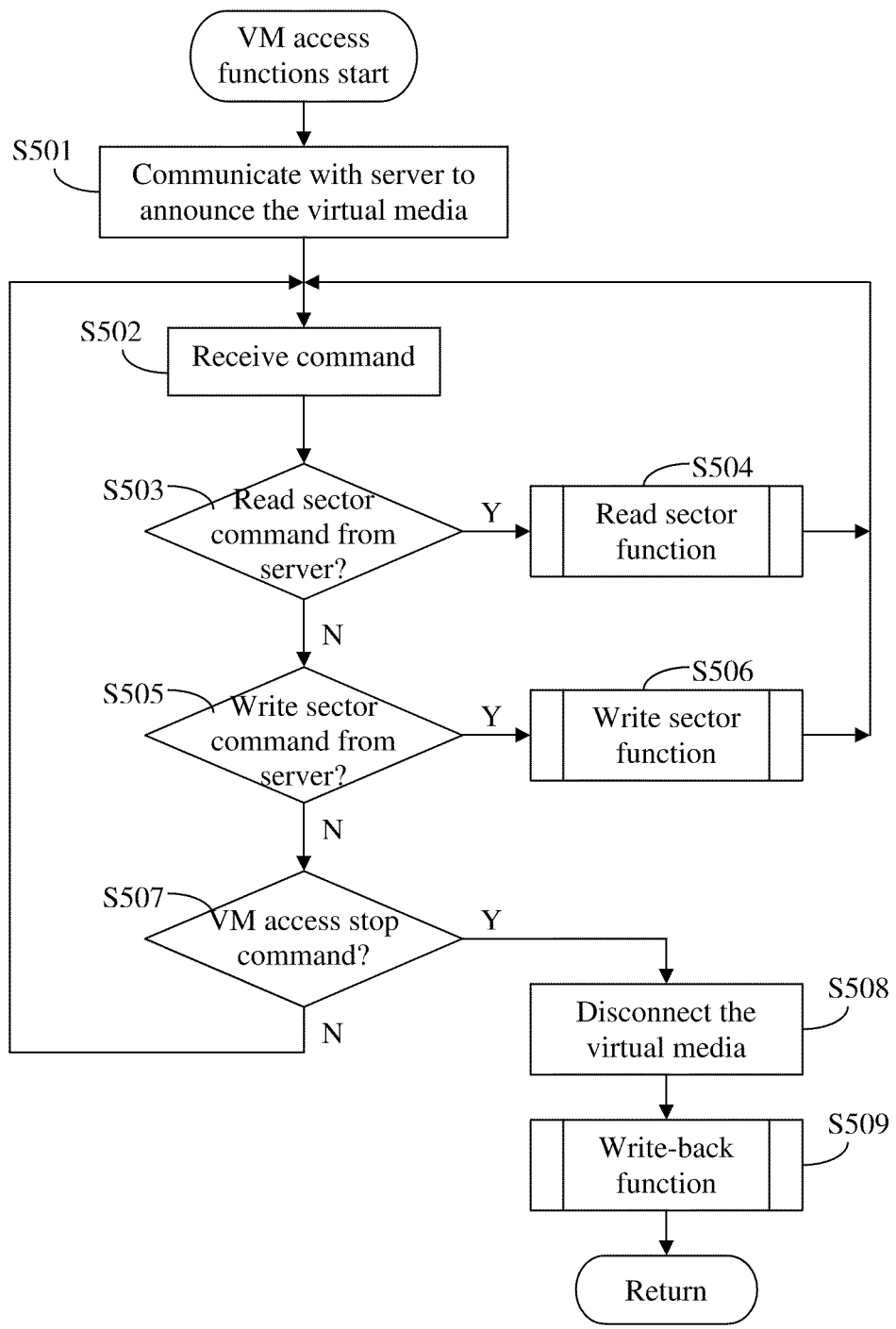
FIG. 5 schematically illustrates a virtual media access process for a folder mounted virtual media according to an embodiment of the present invention.

FIG. 5 illustrates an overall process of the VM access functions. First, the client computer 10 cooperates with the IKVM switch 20 and the computer module 30 to announce the virtual media the server computer 40 (step S501). For example, if the virtual media is presented as a USB mass storage device, the computer module 30 (also referred to as a server control module) emulates a USB mass storage device. This step may be similar to the corresponding step in a conventional virtual media method and is not explain in further detail here. As a result of this step, the virtual media will appear as a storage drive on the server computer. Thereafter, the server computer can read, write, and perform other function to the storage drive as if it is a normal drive. The forms of the communication commands between various components are described in more detail later with reference to FIG. 9.

When the server receives a command (step S502), the command may be an I/O command from the server computer 40 or a command from the user of the client computer 10. If the command is a read sector commend form the server computer ("Y" in step S503), the client performs a read sector function (step S504, shown in more detail in FIG. 6). If the command is a write sector commend form the server computer ("Y" in step S505), the client computer performs a write sector function (step S506, shown in more detail in FIG. 7).

The command received in step S502 may be a virtual media access stop command. The stop command may be received from the client computer 10 itself; for example, the user at the client computer may issue a VM stop command. The stop command may also be received from the server computer 40; for example, the server computer may "remove" the media using an OS operation. When a stop command is received ("Y" in step S507), the client computer 10 communicate with the server computer 40 to disconnect the virtual media, i.e., "remove" it from the server 40 (step S508). This step may be similar to the corresponding steps in a conventional virtual media method and is not explain in further detail here. After removing the virtual media from the server computer 40, the client computer 10 executes a write-back function to write the data stored in the temporary data area to the files in the actual file system and/or to delete files from the actual file system as appropriate (step S509, shown in more detail in FIG. 8).

Figure 6:
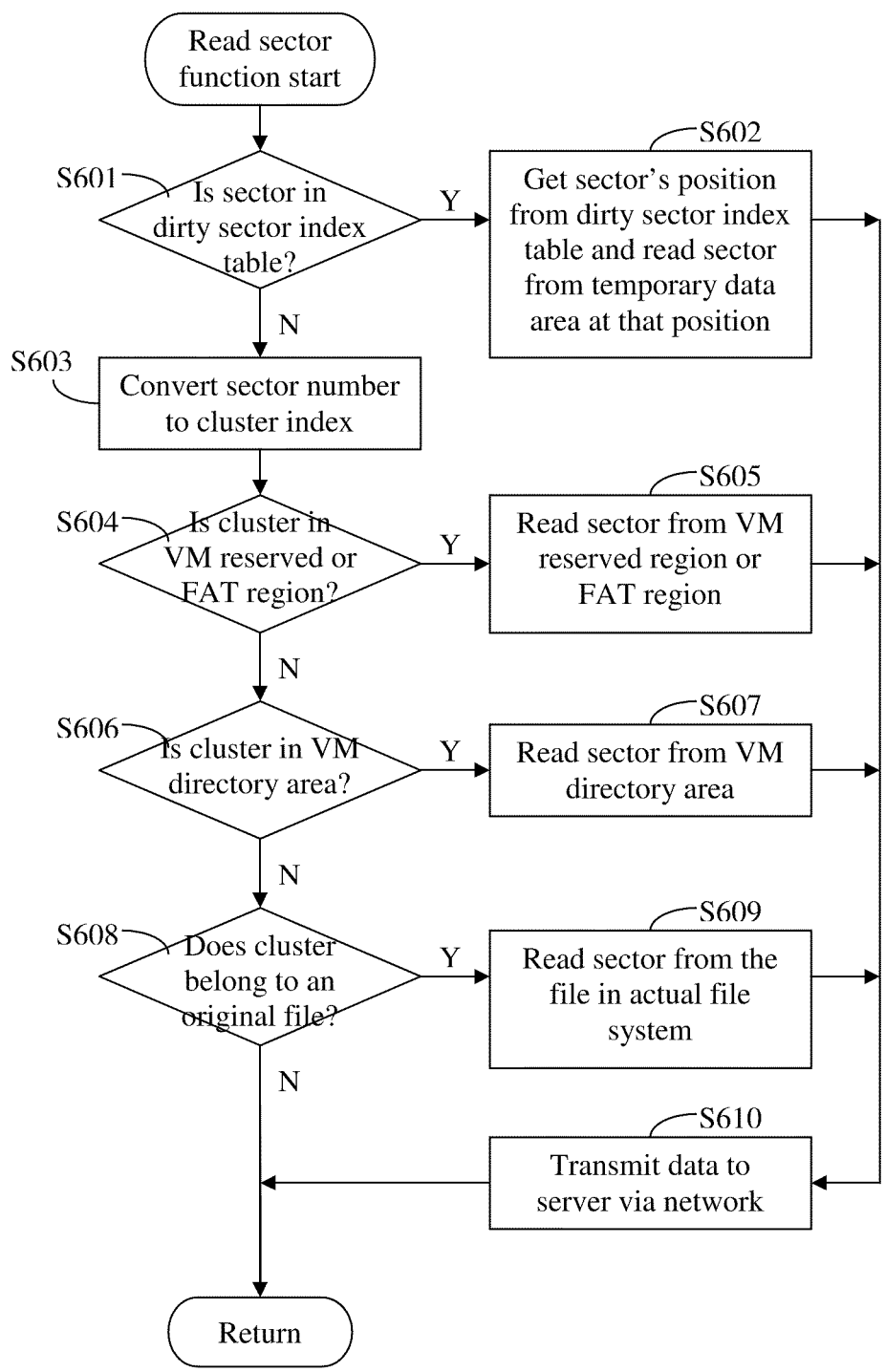
FIG. 6 schematically illustrates a read sector function for a folder mounted virtual media according to an embodiment of the present invention.

FIG. 6 schematically illustrates the read sector function (step S504 in FIG. 5). Note that the sector number in the read sector command from the server computer is the virtual sector number in the virtual drive. First, the client computer determines whether the virtual sector is in the dirty sector index table by looking up the dirty sector index table (step S601). A virtual sector will be in the dirty sector index table if it has been previously modified by the server computer and has been stored as a temporary sector in the temporary data area (described in more detail in FIG. 7). If the virtual sector is in the dirty sector index table ("Y" in step S601), the client computer obtains the position of the temporary sector in the temporary data area that corresponds to the dirty sector by using the dirty sector index table (see FIG. 3d), and reads the temporary sector from the temporary data area at that position (step S602).

If the virtual sector is not in the dirty sector index table ("N" in step S601), the client computer converts the virtual sector number to a virtual cluster index (step S603). This conversion step uses a conversion formula for the virtual drive, which is similar in nature to a conversion formula for a normal drive. The conversion also determines the place (i.e. the offset) of the sector within that virtual cluster. Then, the client computer determines whether the converted virtual cluster is in the VM reserved region or the VM FAT region of the virtual drive (step S604). If it is ("Y" in step S604), the client computer reads the sector in the VM reserved region or the VM FAT region (step S605). If not ("N" in step S604), the client computer determines whether the virtual cluster is in the VM directory area of the virtual drive (step S606). The directory area here includes the VM root directory region and the sub-directories in the VM File and directory data region (refer to FIG. 3a). If the virtual cluster is in the VM directory area ("Y" in step S606), the client computer reads the sector in the VM directory area (step S607). If not ("N" in step S606), the client computer determines whether the virtual cluster belongs to an original file in the actual file system (step S608).

Step S608 is carried out by using the file-cluster index table (see FIG. 3c). At this point, it has been determined that the virtual sector is not in the dirty sector index table (i.e. it is not dirty), so the data for this sector is not stored in the temporary data area and must be obtained from the original file in the actual file system. Thus, in step S608, the client uses the virtual cluster index (obtained in step S603) and looks up the file-cluster index table to determine which file this virtual cluster is assigned to. By looking up the file-cluster index table, the client computer determines the filename and path of the file in the actual file system, as well as the place of this virtual cluster in the sequence of virtual clusters assigned to the file (e.g. it is the i-th cluster of the file). As mentioned before, the file-cluster index table may store the start and end virtual cluster index for each file, or it may store an ordered list of all virtual clusters assigned to each file. Either way, the client computer is able to determine the place of this cluster in the file. In addition, based on the offset of the requested sector within the virtual cluster (e.g., the sector is the j-th sector of that virtual cluster, see step S603), the client computer determines the offset of the sector within the file (e.g., the sector is the k-th sector of the file). Using the filename and path, as well as the offset of the sector in the file, the client computer issues a read command to the client's operating system to read the specified sector of the specified file (step S609). The OS responds to the read command in a conventional manner to read the requested data of the sector and pass it to the virtual media management software 12.

After steps S602, S605, S607 and S609, the client computer 10 transmits the data read in these steps to the server computer 40 via the network (step S610).

Figure 7:
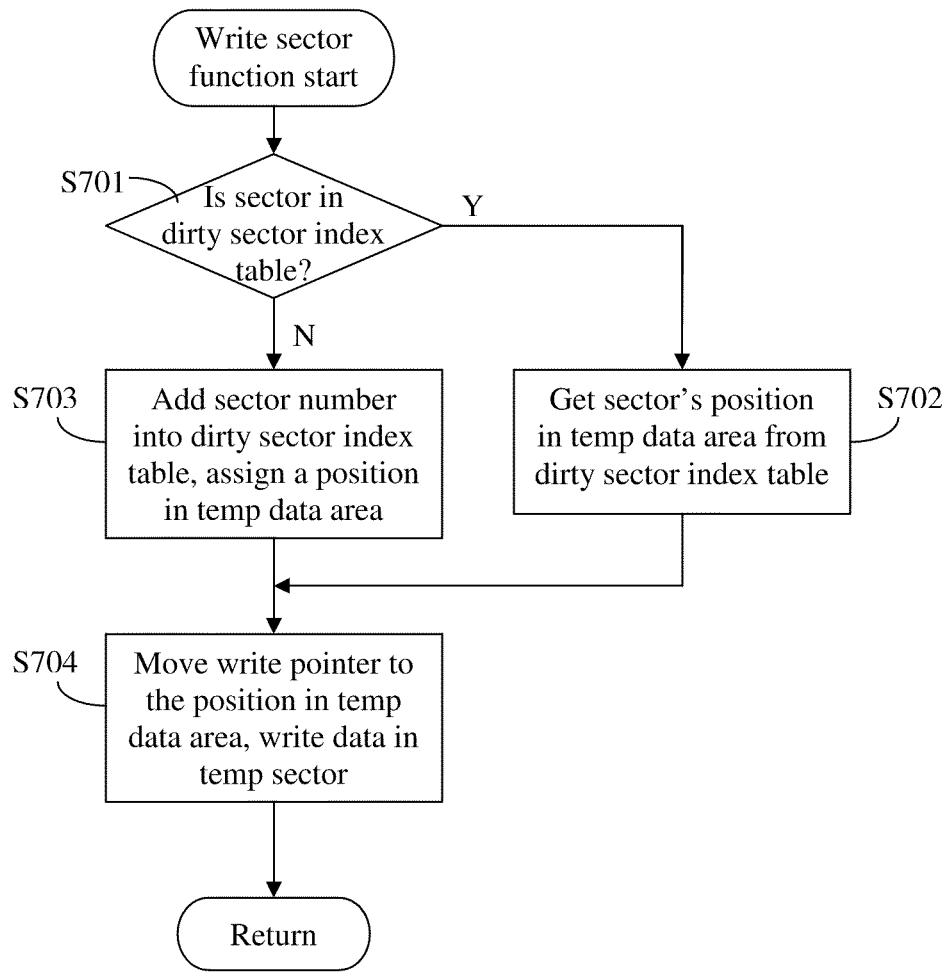
FIG. 7 schematically illustrates a write sector function for a folder mounted virtual media according to an embodiment of the present invention.

FIG. 7 schematically illustrates the write sector function (step S506 in FIG. 5). Note that the sector number in the write sector command from the server computer is the virtual sector number in the virtual drive. First, the client computer determines whether the virtual sector is in the dirty sector index table by looking up the dirty sector index table (step S701). If it is ("Y" in step S701), the client computer obtains the position of the temporary sector in the temporary data area that corresponds to the dirty sector by using the dirty sector index table (see FIG. 3d) (step S702). If the virtual sector is not in the dirty sector index table ("N" in step S701), the client computer adds the virtual sector number into the dirty sector index table and assigns to it a position of an unused sector in the temporary data area (step S703). After steps S702 and S703, the client computer moves the write pointer to that position of the temporary data area and writes the data from the server to the temporary sector at that position (step S704).

It should be noted that during the time the source folder is mounted as a virtual drive, the operating system of the server computer 40 manages the virtual drive as if managing an actual drive. For example, if the server computer creates a new file on the virtual drive, the server's OS will assign virtual cluster numbers to the new file, and will modify the virtual FAT table accordingly via a write command. Thus, at the client's end, the virtual media management software 12 only needs to manage the write commands from the server computer as describe above.

As a result of the VM write function, the server computer 40 may create new subfolders under the source folder, create new data files in the source folder, modify existing data files, modifying the properties of data files and folders or subfolders, etc. Further, the VM FAT table and the subdirectory entries may also be modified. All of the changes are stored in the temporary data area without changing the sectors/clusters of the actual file system or the VM file system created at the time of mounting. As illustrated in FIG. 4, the single-directional arrow from the "VM FAT, directories, file-cluster index table" 406 to the "Virtual media access functions" S404 indicates that the data in 406 is not modified during VM access.

Figure 8:
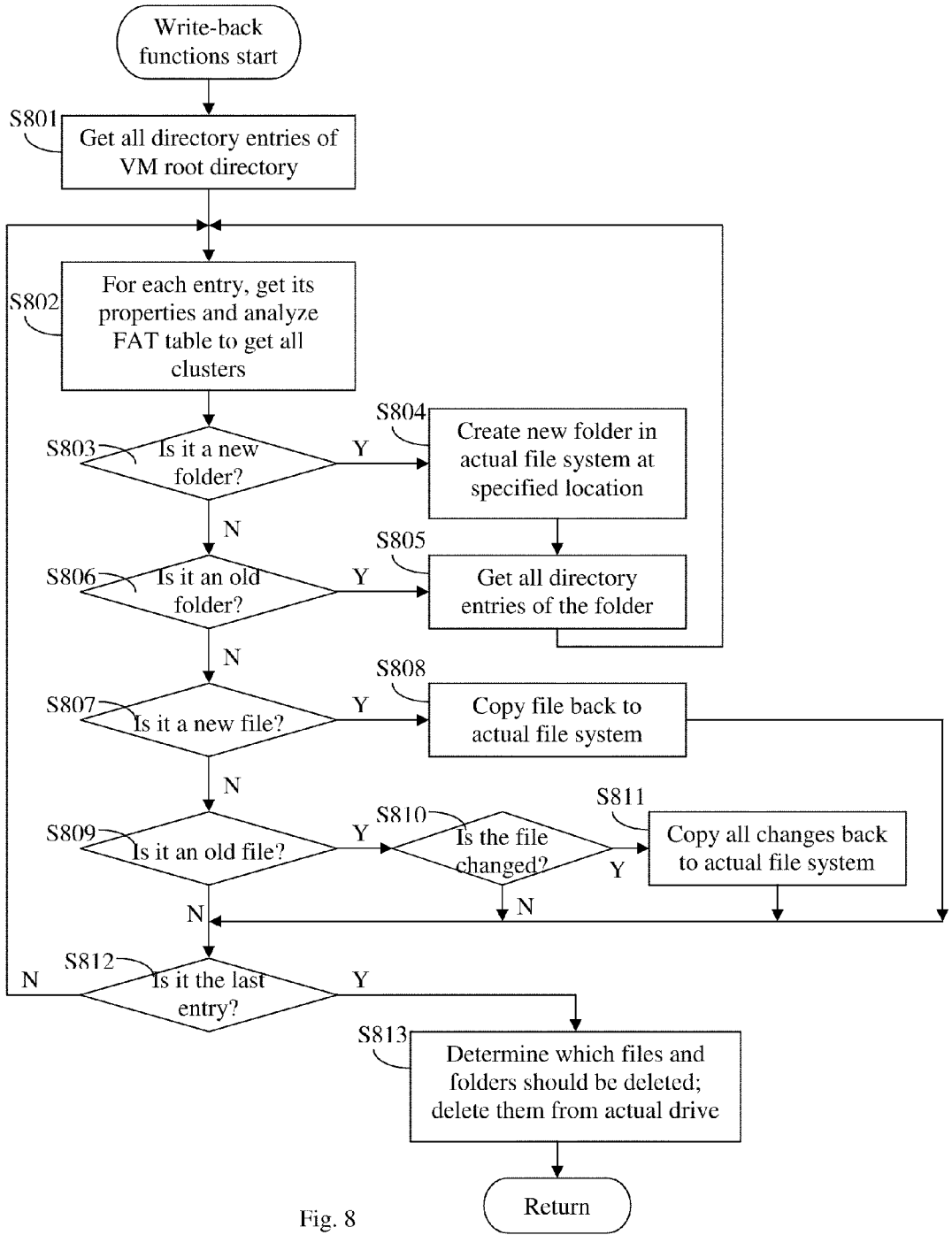
FIG. 8 schematically illustrates a write-back function for a folder mounted virtual media according to an embodiment of the present invention.

FIG. 8 schematically illustrates the write-back function (step S509 in FIG. 5). First, the client obtains all the directory entries of VM root directory (step S801). In the root directory region, each directory entry (which may be a file or a directory) has a predefined length of data, such as 32 bytes, and includes information such as name, properties, and initial cluster index for the file or directory, etc. Note that a file with a long file name may use several directory entries to store the above information. For each entry, the client computer obtains the above information (name, properties, initial cluster number, etc.) of the entry, and analyzes the VM FAT table to obtain all of the VM cluster indices for the entry (step S802).

It should be noted that during the VM access, the server computer may have altered the VM root directory region, the VM FAT region and the directories in the VM file and directory region; the altered data have been stored in temporary sectors of the temporary data area and the dirty sectors have been recorded in the dirty sector index table. Thus, in steps S801 and S802, the client computer will consult the dirty sector index table and read the directories and read the VM FAT table from the temporary sectors as appropriate.

The client computer then analyzes this directory entry in a series of steps. Specifically, the client determines whether it is a new folder created by the server during VM access (step S803). To determine whether the directory entry is a new folder, the client computer compares the directory entry with entries stored in the file-cluster index table which is created at the time of mounting and is not changed during VM access. If the directory entry is a new folder ("Y" in step S803), the client computer creates a new folder in the actual file system at the appropriate location (i.e. subfolders) (step S804). The creation of folders may be performed by the client's operating system in a conventional way. The client computer further obtains all of the directory entries contained in this folder by reading the content of the directory entry being analyzed (step S805), adds these directory entries to a list of directory entries to be analyzed, then goes back to step S802 to analyze the next directory entry.

In step S803, if the entry is not a new folder ("N" in step S803), the client determines whether it is an old folder (i.e. one that existed at the time of mounting), again using the file-cluster index table (step S806). If it is ("Y" in step S806), the client obtains all of the directory entries in this folder (step S805), adds these directory entries to the list of directory entries to be analyzed, then goes back to step S802 to analyze the next directory entry. By steps S801-S806, eventually all directory entries in the source folder are examined. Thus, steps S801 and S805 function to collect all data files and subdirectories of the source folder for analysis.

In step S806, if the entry is not an old folder ("N" in step S806), the client determines if the entry is a new file created by the server during VM access (step S807). Again, the file-cluster index table is used to make this determination. If it is ("Y" in step S807), the client copies the file to the actual file system at the appropriate location (step S808). This step includes creating a directory entry for the file in the actual file system and writing the data sectors of the file to the actual file system. When performing the copying, the client reads the sectors of the file from the temporary data area, using the VM FAT table and the dirty sector index table to determine where in the VM file system and the temporary data area the sectors are located.

In step S807, if the entry is not a new file ("N" in step S807), the client determines whether the entry is an old file (i.e. one that existed at the time of mounting), again using the file-cluster index table (step S809). If it is an old file ("Y" in step S809), the client determines whether the file has been changed in either its properties or its content (step S810). In this step, the client compares the properties of the file stored in the file-cluster index table with the new properties of the file stored in VM directory area, and consults file-cluster index table and the dirty sector index table to determine whether its content has changed. If the VM clusters assigned to the file, as stored in the FAT table, include dirty sectors that appear in the dirty sector index table, then the file content has been changed.

In steps S803, S806, S807 and S809 described above, the file-cluster index table is used to determine whether the entry is a new folder, old folder, new file, old file, etc. Alternatively, a separate directory tree structure may be used to perform these steps. The directory tree only contains the path and name for each file and subfolder in the original folder, and uses a tree structure to store the information. The directory tree is built at the time the virtual drive is created (e.g. at the same time the file-cluster index table is created), and is not modified during VM access. Compare to the file-cluster index table, which is in a table form, the tree structure of the directory tree improves the performance of steps S803, S806, S807 and S809, especially when a large number of entries exist in the original folder. More generally, the file-cluster index table, or the file-cluster index table and the directory tree, may be referred to as an initial-state data structure which stores the initial state (filename and path, initial assignment of VM clusters, properties) of the files and subdirectories of the source folder at the time of folder mounting.

Typically, when the file content is changed, the entire file is changed and needs to be copied back to the actual file system. If only the file properties have change and the file content has not, then only the file properties needs to be copied back to the actual file system. If the file has changed ("Y" in step S810), the client copies all of the changes back to actual file system. What is actually copied back depends on what has been changed. Unchanged data area not copied back.

After the copy steps S808 and S811, or when there is no change in the old file ("N" in step S810), or the directory entry is not an old file ("N" in step S809), the process goes back to step S802 to analyze the next directory entry, until all directory entries in the directory region of the VM file system have been analyzed ("Y" in step S812). After all directory entries have been analyzed, the client computer determines if any files and folders have been deleted by the server during the VM access (step S813). As explained earlier, during VM access, the files and folders in the actual file system are not modified and not deleted, but the directory entries for these files and folders in the VM file system of the virtual drive have been deleted. All files and folders existing at the time of mounting are recorded in the file-cluster index table. Therefore, by analyzing the VM file system, the client computer determines which files and folders listed in the file-cluster index table no longer exist in the VM file system. The client computer then deletes these files and folders from the source folder of the actual drive (step S813). This completes the write-back functions.

From the above description, it can be seen that data written to the virtual media is written back to the actual file system of the storage device only after the virtual media is unmounted (i.e. disconnected).

Using the folder-mount technology described herein, any folder or folders on the storage device 14 can be mounted as a virtual drive on the server computer 40; multiple folders may be mounted as multiple virtual drives.

Further, network-shared folders on the client computer 10, i.e. folders located on another computer connected to the client computer 10 by a LAN or WAN, can be mounted on the server computer 40 as a virtual drive. The technology for sharing folders among computers connected by a LAN or WAN is well known and will not be described in more detail here. To mount a network-shared folder of the client computer 10 on the server computer 40, the same processes described in FIGS. 4-8 are performed. As described earlier, when the client creates the VM file system and reads data from the actual file system during VM access, the VM management software 12 uses the client's OS to read data from and write data to the actual file system on the storage device 40. In other words, the VM management software 12 interacts with the actual file system through the client's OS. Since the OS can handle reading and writing of a network-shared folder, the operation of the VM management software 12 is the same regardless of whether the source folder to be mounted on the server 40 is a network-shared folder or a folder of a physical storage device attached to the client 10. In this disclosure, the term storage device 14 can generally cover network-shared folders in addition to physical storage devices attached to the client computer 10.

The folder-mount method described above is applicable regardless of the file system of the storage device 14. For example, the file system of the storage device 14 may be NTFS, FAT 16, FAT 32, etc. Because the VM management software 12 interacts with the actual file system of the storage device 14 through the client's OS, the VM management software 12 is not concerned with the actual file system of the storage device 14 so long as it can correctly request the OS to read specified information.

The VM file system created by the VM management software 12 may be any suitable file system provided that the computer module 30 can interact with the VM file system. For example, the VM file system is not limited to a virtual FAT file system. In the virtual FAT file system described herein, the directories store the starting virtual cluster index of each directory entry (file or subdirectory) and the virtual FAT table stores the cluster indices of the subsequent clusters for the files, so that the directories and the VM FAT table together describe the sequence of virtual clusters assigned to each file in the source folder. Other VM file system may be used, so long as the VM file system contains VM index information that describe the sequence of virtual clusters assigned to each file in the source folder. Unlike the actual file system, the VM file system does not include the clusters that store the actual data files.

Figure 9:
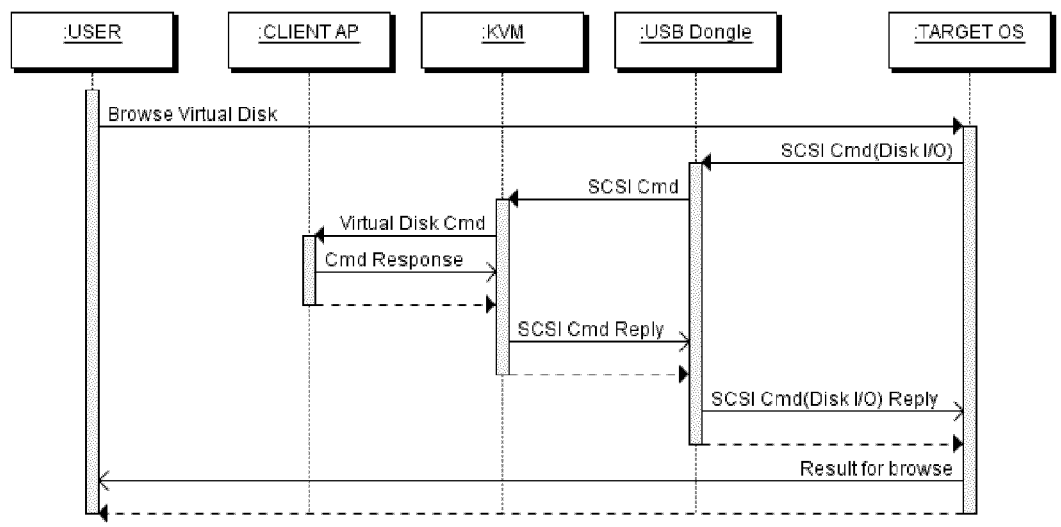
FIG. 9 schematically illustrates the command and data transmitted between various components of the system of FIG. 1 during virtual media access.

FIG. 9 schematically illustrates the command (which includes any data as appropriate) transmitted between various components of the IKVM system (refer to FIG. 1) during virtual media access. In this example, the virtual drive has been mounted on the server computer, and the user at the client computer 10 controls the server computer 40 via the IKVM switch 20, and controls the server 40 to access the virtual drive. These steps are generally similar to the steps of virtual media access in conventional IKVM virtual media systems, except that the virtual media has been folder-mounted instead of drive-mounted.

In the example of FIG. 9, the user sends a keyboard or mouse command to the operating system of the server computer 40 ("target OS"), via the IKVM switch 20 and the computer module 30, to browse a directory of the virtual drive. As explained earlier, the client computer 10 and the IKVM switch 20 communicate using a network protocol such as TCP/IP. The OS of the server computer 40 sends a disk I/O command (include any data as appropriate) to the computer module ("USB dongle" in this example) 30 to access the drive. Most operating systems usually use SCSI command sets to perform USB Disk I/O functions, so the disk I/O command here may be SCSI commands.

As explained earlier, the computer module 30 emulates a USB mass storage device for the server 40, and command (including data) transfer between the computer module 30 and the server computer 40 is done using the USB protocol. The computer module 30 sends a SCSI command (include any data as appropriate) to the IKVM switch 20. If the disk I/O commands from the server 40 are SCSI commands, then the computer module 30 may simply forward them to the KVM switch 20. As explained earlier, the computer module 30 communicates with the IKVM switch 20 using an internal communication protocol, which is the SCSI standard in this example. The IKVM switch 20 sends a virtual drive command (include any data as appropriate) to client computer 10. The virtual drive commands between the IKVM switch 20 and the client 10 may use a proprietary format defined by the manufacturers.

The KVM management software 11 of the client computer 10 transfers the command to the virtual media management software 12, which performs the appropriate steps (e.g. the processes shown in FIGS. 5-7, in particular, the read sector function shown in FIG. 6). The KVM management software 11 and the virtual media management software 12 collectively correspond to the "Client AP" (client application program) in FIG. 9. The client AP sends a command response, including any data read from the virtual and/or actual drive, to the IKVM switch 20. The IKVM switch 20 sends a SCSI command reply, including any data, to the computer module 30, and the computer module 30 sends a disk I/O command reply (which may be a SCSI command reply), including any data, to the OS of the server computer 40. Then, the server computer 40 transmits the result of the browse as displayed on the server's desktop, in the form of video data, to the client 10 via the computer module 30 and the IKVM switch 20. The IKVM management software 11 displays the video data on the monitor of the user interface devices 15 of the client computer 10.

Similarly (not shown), when the user at the client computer 10 wishes to control the server 40 to open a file from the virtual drive, the client computer sends an open file command to the server 40 via the IKVM switch 20. In this case, the commands sent from the IKVM switch 20 to the client AP will be read virtual drive sector commands, and the client AP will return the data read from the appropriate sector to the IKVM switch 20. Likewise (not shown), when the user at the client computer 10 wishes to control the server computer 40 to store a file to the virtual drive, the client computer sends an save file command to the server computer 40 via the IKVM switch 20. In this case, the commands sent from the IKVM switch 20 to the client AP will be write virtual drive sector commands, and the IKVM will also sends the data for the sector to the client AP.

Although in above examples the computer module 30 emulates a USB mass storage device to the server computer 40, the computer module 30 may emulate a storage device complying with other standard protocols.

In the IKVM system shown in FIG. 1, the server computer 40, the computer module 30, the IKVM switch 20, and the KVM management software 11 of the client 10 may be the same as the corresponding components in a conventional IKVM switch system having disk-mount virtual media functions. The folder-mount aspects of the virtual media functions according to embodiments of the present invention are accomplished by the virtual media management software 12 of the client computer 10.

Further, although the system of FIG. 1 has an IKVM switch 20 which is connected to the server computer 40 by a computer module 30, the VM access functions of the computer module 30 and the IKVM switch 20 described above can be performed by any module having appropriate hardware and firmware/software to perform these VM access functions. Such a module, referred to as a VM access control module for convenience, may be a module physically separated from the server computer 40 and connected between the server 40 and the network 100, or it may be a part of the server computer 40. From the viewpoint of the client 10, the VM access control module is a device located on the network 100 that sends virtual drive commands (as described above) to the client and receives command response from the client. From the viewpoint of the OS of the server 40, the VM access control module appears to be a virtual drive and can receive disk I/O commands from the server computer 40 and provide reply to the disk I/O commands.

Advantages of the folder-mount method described herein include enhanced flexibility, compatibility, safety, reliability, and security. It allows the user of client computer to flexibly allow the server to access some but not all of the contents on the entire physical storage device, thereby protecting the confidentiality and security of data on the physical drive. It significantly reduces or eliminates the risk of crashing the physical storage device during a write operation. It can support virtual media function when the physical storage device and the virtual drive use different file systems (for example, the physical storage device uses a NTFS while the virtual drive uses FAT16).

Although the virtual media method is described herein in an IKVM switch system, more generally, it can be applied to any system where a server is remotely accessed from a client computer via a network using a network protocol (e.g. TCP/IP). Once logged in to the server, the remote client can exchange keyboard, video and mouse signals with the server and control the server. The folder-mount virtual media method described herein can be applied to such a server-client system. It should be noted that the "server" and "client" designations are used for convenience only and do not require the two computers to have any particular characteristics.

It will be apparent to those skilled in the art that various modification and variations can be made in the folder-mount virtual media method and apparatus of the present invention without departing from the spirit or scope of the invention. Thus, it is intended that the present invention cover modifications and variations that come within the scope of the appended claims and their equivalents.

What is claimed is:

1. In a system including a client computer and a server connected to each other, the client computer having a storage device storing a plurality of files and folders using a file system, a method for presenting one of the folders to the server to be accessed as a virtual drive, comprising:
   (a) selecting the one folder to be accessed by the server, the selected folder containing a plurality of subdirectories and data files;
   (b) for each data file in the selected folder, assigning a sequence of one or more virtual cluster indices to the data file based on a size of the data file;
   (c) generating a virtual media (VM) file system on the client computer for the selected folder, the VM file system including VM index information describing the sequence of virtual cluster indices assigned to each data file of the selected folder, without including any data content of the data files;
   (d) generating an initial-state data structure which stores an initial state of each data file in the selected folder, the initial state of each data file including its filename and path in the file system of the storage device, its properties, and the virtual cluster indices assigned to it in step (b); and
   (e) in response to a VM read sector command specifying a virtual sector number for reading a data, where the virtual sector numbers is related to a virtual cluster index by a predetermined conversion formula, performing a VM read function which includes:

(e1) if the specified virtual sector number is a sector in the VM file system, reading the data from the sector in the VM file system; and (e2) if the specified virtual sector number is not a sector in the VM file system, determining the data file to which the sector belongs using the initial-state data structure and using the predetermined conversion formula, obtaining a name and path of the data file and a sector offset of the virtual sector within the data file, and reading the data from the storage device using the name and path and the sector offset.

2. The method of claim 1, further comprising:

(f) before step (e), generating and maintaining a dirty sector index table which stores a list of virtual sector numbers for dirty sectors and corresponding temporary sector numbers in a temporary data area, each dirty sector being a sector that is specified in one or more VM write commands during VM access;

wherein steps (e1) and (e2) are performed if the specified virtual sector number is not in the dirty sector index table, and wherein step (e) further includes:

(e3) if the specified virtual sector number is in the dirty sector index table, obtaining the corresponding temporary sector number from the dirty sector index table, and reading the data from that temporary sector;

(g) in response to a VM write sector command specifying a virtual sector number for writing a data, performing a VM write function which includes:

(g1) if the specified virtual sector number is in the dirty sector index table, obtaining the corresponding temporary sector number from the dirty sector index table, and writing the data to that temporary sector; and (g2) if the specified virtual sector number is not in the dirty sector index table, adding the virtual sector number to the dirty sector index table, assigning an unused temporary sector to the virtual sector number in the dirty sector index table, and writing the data to the assigned temporary sector.

3. The method of claim 2, further comprising:

(h) in response to a VM stop command, performing a VM write-back function which includes:

(h1) collecting all data files and subdirectories of the source folder for analysis;

(h2) examining each directory entry to determine if it is a new folder, an old folder, a new file or an old file using the initial-state data structure;

(h3) if it is a new folder, creating a new folder in the file system of the storage device;

(h4) if it is a new data file, creating a new file in the file system of the storage device, determining the temporary sector numbers which store data of the file using the VM index information and the dirty sector index table, and copying data from the temporary sectors to the file system of the storage device;

(h5) if it is an old data file, determining if the file is changed in any way using the initial-state data structure, and if the file is changed, determining the temporary sector numbers which store data of the data file using the VM index information and the dirty sector index table and copying data from the temporary sectors to the file system of the storage device; and (h6) determining if any data files or subfolder of the source folder are requested to be deleted by analyzing the initial-state data structure and the VM index information, and deleting the data files or subfolders requested to be deleted.

4. The method of claim 1, wherein the VM file system is a VM FAT (File Allocation Table) file system complying with a FAT file system standard, which includes a VM reserved region, a VM FAT region storing a VM FAT table, a VM root directory region storing a VM root directory, and a virtual media file and directory data region storing subdirectories without storing data contents of any data files, wherein the VM FAT table, the VM root directory, and the subdirectories form the VM index information.

5. The method of claim 1, wherein the initial-state data structure includes a file-cluster index table which stores, for each data file, its filename and path in the file system of the storage device, its properties, and the virtual cluster indices assigned to it in step (b).

6. The method of claim 5, wherein the initial-state data structure further includes a directory tree structure which stores the path and filename for each data file in the source folder using a tree structure.

7. A system implementing virtual media functions, including:

a virtual media (VM) management software module in a client computer;

a VM access control module connected to the client computer by a network; and a server control module connected to the VM access control module, the server control module emulating a storage device complying with a standard protocol for a server computer, wherein the VM management software module, when executed by the client computer, enables the server to access, as if a local drive, a specified one of a plurality of folders stored in a storage device coupled to the client computer without allowing the server to access to other contents of the storage device, wherein the storage device stores the plurality of files and folders using a file system;

wherein the VM access control module receives disk I/O commands from the server, generates virtual media commands based on the disk I/O commands, transmits the virtual media commands to the client computer via the network, receives virtual media command responses from the client computer, generates disk I/O replies based on the virtual media command responses, and transmits disk I/O replies to the server, wherein the VM management software module is configured to perform a virtual media method for presenting the one of the plurality of folders on the storage device to the server to be accessed as a virtual drive, including:

(a) selecting the one folder to be accessed by the server, the selected folder containing a plurality of subdirectories and data files;

(b) for each data file in the selected folder, assigning a sequence of one or more virtual cluster indices to the data file based on a size of the data file;

(c) generating a virtual media (VM) file system on the client computer for the selected folder, the VM file system including VM index information describing the sequence of virtual cluster indices assigned to each data file of the selected folder, without including any data content of the data files;

(d) generating an initial-state data structure which stores an initial state of each data file in the source folder, the initial state of each data file including its name and path in the file system of the storage device, its properties, and the virtual cluster indices assigned to it in step (b); and (e) in response to a VM read sector command from the VM access control module which specifies a virtual sector number for reading a data, where the virtual sector numbers is related to a virtual cluster index by a predetermined conversion formula, performing a VM read function which includes:

(e1) if the specified virtual sector number is a sector in the VM file system, reading the data from the sector in the VM file system, and transmitting the data to the VM access control module; and (e2) if the specified virtual sector number is not a sector in the VM file system, determining the data file to which the sector belongs using the initial-state data structure and using the predetermined conversion formula, obtaining a name and path of the data file and a sector offset of the virtual sector within the data file, issuing a command to the operating system to read the data from the storage device using the name and path and the sector offset, receiving the data from the operating system, and transmitting the data to the VM access control module.

8. The system of claim 7, wherein the virtual media method further includes:

(f) before step (e), generating and maintaining a dirty sector index table which stores a list of virtual sector numbers for dirty sectors and corresponding temporary sector numbers in a temporary data area, each dirty sector being a sector that is specified in one or more VM write commands during VM access;

wherein steps (e1) and (e2) are performed if the specified virtual sector number is not in the dirty sector index table, and wherein step (e) further includes:

(e3) if the specified virtual sector number is in the dirty sector index table, obtaining the corresponding temporary sector number from the dirty sector index table, reading the data from that temporary sector, and transmitting the data to the VM access control module;

(g) in response to a VM write sector command specifying a virtual sector number for writing a data, performing a VM write function which includes:

(g1) if the specified virtual sector number is in the dirty sector index table, obtaining the corresponding temporary sector number from the dirty sector index table, and writing the data to that temporary sector; and (g2) if the specified virtual sector number is not in the dirty sector index table, adding the virtual sector number to the dirty sector index table, assigning an unused temporary sector to the virtual sector number in the dirty sector index table, and writing the data to the assigned temporary sector.

9. The system of claim 8, wherein the virtual media method further includes:

(h) in response to a VM stop command, performing a VM write-back function which includes:

(h1) collecting all data files and subdirectories of the source folder for analysis;

(h2) examining each directory entry to determine if it is a new folder, an old folder, a new file or an old file using the initial-state data structure;

(h3) if it is a new folder, creating a new folder in the file system of the storage device;

(h4) if it is a new data file, creating a new file in the file system of the storage device, determining the temporary sector numbers which store data of the file using the VM index information and the dirty sector index table, and copying data from the temporary sectors to the file system of the storage device;

(h5) if it is an old data file, determining if the file is changed in any way using the initial-state data structure, and if the file is changed, determining the temporary sector numbers which store data of the data file using the VM index information and the dirty sector index table and copying data from the temporary sectors to the file system of the storage device; and (h6) determining if any data files or subfolder of the source folder are requested to be deleted by analyzing the initial-state data structure and the VM index information, and deleting the data files or subfolders requested to be deleted.

10. The system of claim 7, wherein the VM file system is a VM FAT (File Allocation Table) file system complying with a FAT file system standard, which includes a VM reserved region, a VM FAT region storing a VM FAT table, a VM root directory region storing a VM root directory, and a virtual media file and directory data region storing subdirectories without storing data contents of any data files, wherein the VM FAT table, the VM root directory, and the subdirectories form the VM index information.

11. The system of claim 7, wherein the initial-state data structure includes a file-cluster index table which stores, for each data file, its name and path in the file system of the storage device, its properties, and the virtual cluster indices assigned to it in step (b).

12. The system of claim 11, wherein the initial-state data structure further includes a directory tree structure which stores the path and name for each data file in the source folder using a tree structure.

13. The system of claim 7, wherein the storage device is a hard disk drive, a CD drive, a DVD drive, a flash drive, a floppy disk drive, or a network-shared folder.

14. The system of claim 7, wherein the file system of the storage device is a FAT file system or an NTFS file system.

15. The system of claim 7, wherein the VM access control module emulates a USB mass storage device for the server.

16. The system of claim 7, wherein the VM access control module includes:

a computer module connected to the server; and a switch device connected to the computer module and connected to the client computer via the network.

* * * * *